(12) United States Patent
Eriksen (10) Patent No.: US 12,330,348 B2
(45) Date of Patent: Jun. 17, 2025

(54) DEVICE FOR TREATING A MOLD SURFACE, USE OF THE DEVICE, AND METHOD FOR TREATING A MOLD SURFACE

(71) Applicant: Klingspor Windpower APS, Kolding (DK)

(72) Inventor: Keld Eriksen, Fredericia (DK)

(73) Assignee: KLINGSPOR WINDPOWER AG, Kolding (DK)

( * ) Notice: Subject to any disclaimer, the term of this patent is extended or adjusted under 35 U.S.C. 154(b) by 0 days.

(21) Appl. No.: 17/926,829

(22) PCT Filed: Feb. 2, 2022

(86) PCT No.: PCT/EP2022/052507
§ 371 (c)(1),
(2) Date: Nov. 21, 2022

(87) PCT Pub. No.: WO2022/171506
PCT Pub. Date: Aug. 18, 2022

(65) Prior Publication Data
US 2024/0009896 A1    Jan. 11, 2024

(30) Foreign Application Priority Data
Feb. 15, 2021   (EP) ..................................... 21157072

(51) Int. Cl.
*B29C 33/58* (2006.01)
*B29C 33/72* (2006.01)
*B29L 31/08* (2006.01)

(52) U.S. Cl.
CPC .............. *B29C 33/58* (2013.01); *B29C 33/72* (2013.01); *B29L 2031/085* (2013.01)

(58) Field of Classification Search
CPC .......... B29C 33/58; B29C 70/342; B05C 1/06
See application file for complete search history.

(56) References Cited

U.S. PATENT DOCUMENTS

| 2,179,963 A | 11/1939 | Spadone |
| 4,253,607 A * | 3/1981 | Gerard, Sr. ............. B05B 15/62 |
| | | 141/279 |

(Continued)

FOREIGN PATENT DOCUMENTS

| CN | 106695500 B | 11/2018 |
| CN | 110576379 A | 12/2019 |

(Continued)

OTHER PUBLICATIONS

Extended European Search Report of corresponding application EP21157072.6; European Patent Office; mailed Aug. 6, 2021.

(Continued)

*Primary Examiner* — Dah-Wei D. Yuan
*Assistant Examiner* — Andrew J Bowman
(74) *Attorney, Agent, or Firm* — Quarles & Brady LLP (57) ABSTRACT

A device for treating a mold surface limiting a mold cavity of a mold or being an outer surface of a mold core for producing a mold, the device comprising: a treating carriage having at least one treating drum and/or at least one liquid application and/or release means; a guiding arrangement connected to the treating carriage and serving to displace the treating carriage on the mold surface; and a control unit connected to the treating carriage and the guiding arrangement.

14 Claims, 9 Drawing Sheets

(56) References Cited

U.S. PATENT DOCUMENTS 9,005,381 B2 * 4/2015 Schibsbye ............. B29C 70/342
156/286
2017/0144175 A1 * 5/2017 Bignon ..................... B05C 1/06

FOREIGN PATENT DOCUMENTS

| CN | 110712326 A | | 1/2020 | |
| EP | 1275484 A2 | | 1/2003 | |
| EP | 2433782 A1 | * | 3/2012 | ............. B29C 70/38 |
| EP | 2495074 A2 | | 9/2012 | |
| WO | 2012003828 A1 | | 1/2012 | |
| WO | 20211051979 A1 | | 3/2021 | |

OTHER PUBLICATIONS

International Search Report and Written Opinion of corresponding application PCT/EP2022/052507; performed by European Patent Office as International Searching Authority; mailed May 18, 2022.
Canadian Intellectual Property Office, Office Action, Application No. 3,178,476, Mar. 21, 2024, 4 pages.

* cited by examiner

DEVICE FOR TREATING A MOLD SURFACE, USE OF THE DEVICE, AND METHOD FOR TREATING A MOLD SURFACE

This application represents the U.S. national stage entry of International Application No. PCT/EP2022/052507 filed Feb. 2, 2022, which claims priority to European Patent Application No. 21157072.6 filed Feb. 15, 2021, the disclosure of which is incorporated herein by reference in its entirety and for all purposes.

The invention relates to a device for treating a mold surface limiting a mold cavity of a mold or being a surface of a mold core, to the use of a device of this kind and to a method for treating a mold surface of a mold for producing a wind blade of a wind turbine or a mold surface of a mold core for producing a mold.

From practice, it is known for wind blades of a wind turbine to be realized as composite components produced in a mold of corresponding dimensions. Since the wind blades can have a length of 50 to 100 m or even more and a diameter of more than 3 m, the mold required for manufacturing the wind blades has to be of a corresponding size. The surface quality of the surface of the resulting wind blades that is exposed to the wind has shown to have a great impact on the electrical energy produced. The surface quality of the wind blades can be influenced by corresponding post-treatment after molding in the mold. Also, the surface quality can be predetermined by the quality of the mold surface limiting a mold cavity of the mold in which the wind blade is produced. Hence, it may be important to treat the mold surface of the mold before the material forming the wind turbine blade is introduced. However, the treatment process has been very time-consuming because of the large dimensions of the mold.

The object of the invention is to provide an optimized device for treating a mold surface. Furthermore, the object of the invention is to provide a time-saving method for treating a mold surface.

So a device for treating a mold surface limiting a mold cavity of a mold or being a surface of a mold core is proposed according to the invention, the device comprising a treating carriage having at least one liquid application and/or release means and/or at least one treating drum, preferably two treating drums, and a guiding arrangement connected to the treating carriage and serving to displace the treating carriage on the mold surface.

So the treating carriage may have at least one treating drum by means of which largescale treatment of the mold surface, which is in particular convex or concave, is possible. For example, the treating drum has a length between 0.5 m and 1.5 m and a diameter between 0.25 m and 0.75 m. The treating carriage can be displaced on the mold surface, in particular also in an automated manner, by means of the guiding arrangement. Preferably, both the treating carriage and the guiding arrangement are electrically connected to a control unit which controls the treating process carried out by the device. This allows the mold surface to be treated efficiently and quickly even if the mold is large, as is the case with a mold used for producing a wind blade of a wind turbine. Of course, it is also conceivable for the device according to the invention to be used to treat a mold surface of a mold core which predetermines the geometry or shape of the mold cavity when producing a mold and whose outer surface essentially corresponds to a geometry of the workpiece which can be produced using the mold and which is a wind blade of a wind turbine, for example.

By means of the control device, which can have a user interface, a treating process can be carried out automatically or semi-automatically on the basis of parameters provided by a user via the user interface.

In a preferred embodiment of the device according to the invention, the treating carriage is a sanding carriage, which means that the treating drum is realized as a sanding drum. The mold surface can be sanded and thus treated by rotation of the sanding drum. For example, the effective surface of the sanding drum is formed by abrasive flaps which are oriented parallel to the axis of rotation of the sanding drum and which define the circumferential surface of the sanding drum.

The treating carriage can also be designed in such a manner that it additionally or alternatively serves to apply release agents, cleaning agents, sealing agents or the like. Such a liquid application is performed with aid of the liquid application means, which can comprise a nozzle or a set of nozzles for the respective liquid.

As already mentioned, the treating carriage preferably comprises two treating drums.

According to a preferred embodiment of the device according to the invention, the treating carriage comprises a support on which the treating drums are mounted to rotate, in order for the treating carriage to be provided with sufficient stability. Wheels via which the treating carriage rests on the mold surface can be mounted on the support, as well.

It can be advantageous if the treating carriage supports changes in movement which are predetermined by the guiding arrangement of the device according to the invention. For example, this can be achieved if the support of the treating carriage comprises a joint via which two support units, on each of which one of the treating drums is mounted, are connected to each other in a movable manner, allowing the two treating drums to be pivoted relative to each other. When the direction changes during displacement of the treating carriage, the treating drums are pivoted relative to each other about the joint, whose axis is preferably oriented at a right angle to the base plane of the treating carriage.

In order to be able to control the two treating drums of the treating carriage separately and to operate them at different rotational speeds, for example, it is advantageous if the two treating drums are each provided with a separate drive motor. The drive motors drive the treating drums via a belt drive, for example, or via another type of gear mechanism, such as a spur gear.

To optimize the treatment force exerted on the mold surface by the at least one treating drum, it can be advantageous if the treating carriage comprises a means for shifting its center of gravity. In particular if the mold surface is curved and has a convex or concave shape, the center of gravity of the treating carriage can be changed as a function of the position of the treating carriage on the mold surface, allowing ideal treatment results to be achieved.

For example, the means for shifting the center of gravity comprises a shiftable weight. The shiftable weight can be disposed on a pivotable pole which is mounted in particular on the support of the treating carriage and whose pivoted position relative to the support can preferably be locked.

In a specific embodiment of the device according to the invention, the guiding arrangement serving to displace the treating carriage on the mold surface comprises a cable system attached to the treating carriage. The pulling forces exerted on the cable system displace the treating carriage on the mold surface.

The cable system preferably comprises at least two cables which are attached to opposite sides of the treating carriage via respective attachment elements and which can each be wound onto a winch. The combined action of the two winches of the two cables allows the treating carriage to be moved on the mold surface in a defined manner. The winches can either be disposed on the treating carriage itself and be part of the respective cable attachment elements or be connected to the ends of the cables facing away from the treating carriage.

In the case at hand, the term "cable" is to be interpreted in its broadest sense and comprises both classical cables or ropes which can be made of metal or another material and belts, chains, wires, tendons and other cable-like means that can be wound.

The attachment elements via which the cables of the cable system are attached to the treating carriage can be designed height-adjustable. By adjusting the height of the attachment elements, the forces exerted on the mold surface in question by the treating drums can be influenced.

In order to be able to displace the guiding arrangement on the mold, it comprises a portal, for example, which straddles the mold and to which the cables of the cable system can be attached. In order for the treating carriage to be able cover the entire mold surface, the portal is preferably movable in the longitudinal direction of the mold or of the mold half of the mold.

In an alternative embodiment of the device according to the invention, the guiding arrangement comprises an actuator which can be placed on a guiding surface of the mold and displaced thereon. For example, the actuators can be displaced freely on the guiding surfaces of the mold, which are adjacent to the mold surface to be treated, or by means of a rail arrangement or the like.

In another specific embodiment of the device according to the invention, the guiding arrangement can comprise a rail system which is disposed on the mold surface to be treated and on which the treating carriage itself is guided. The rail system is attached to the mold surface by vacuum, for example. In order to not leave prints of the rail system on the mold surface, the rail system is removed during the treatment process taking place by means of the treating carriage.

It is also conceivable to use a robot arm as part of the guiding arrangement.

Of course, it is also conceivable for the different embodiments of the guiding arrangement to be suitably combined with each other.

In order to be able to test the surface quality before or after treatment by means of the treating carriage, the device according to the invention can be provided with at least one corresponding sensor which measures the roughness, the gloss or other properties of the mold surface, for example. The sensor may be provided on the treating carriage and/or at any other location, for example on the guiding arrangement or at an edge of the mold. The sensor may be a 3D scanner or any other suitable sensor which can detect the surface properties in question.

Furthermore, the device according to the invention can comprise a suctioning device for material removed from the mold surface by the treating carriage. The suctioning device can be integrated in the treating carriage or realized as a separate device.

If the device according to the invention is supposed to be used to carry out a wet sanding process, a storage and filter system for liquids can be integrated in the treating carriage or disposed in a separate device which can also be movable parallel to the treating carriage during operation by means of the guiding arrangement, for example. Such a system can work with little water since the filter system allows the water to be reused and makes a water cycle possible. This might render a drying process unnecessary and reduces the waste products generated during sanding. Hose lines of the storage and filter system are preferably attached to the treating carriage. They can be used to apply water directly to the mold surface and also to collect the water again and store it as wastewater, where appropriate.

The invention also relates to the use of the device described above for treating a mold surface limiting a mold cavity of a mold for producing a wind blade of a wind turbine or being an outer surface of a mold core for forming a mold cavity of a mold.

The method according to the invention for treating a mold surface of a mold core for producing a mold or for treating a mold for producing a wind blade of a wind turbine comprises the following steps:

disposing a treating carriage on the mold surface;
activating the treating carriage;
moving the treating carriage on the mold surface in the transverse direction of the mold; and
displacing the treating carriage on the mold surface in the longitudinal direction of the mold, such that the entire mold surface is treated by means of the at least one treating carriage according to a treatment pattern.

According to a preferred embodiment of the method according to the invention, the treatment pattern, which is preferably preset, comprises treatment lanes along which the treating carriage is moved across the mold surface. The treatment pattern can be set by means of a control unit on the basis of mold parameters.

In the method according to the invention, the treating carriage is preferably moved across the mold surface along parallel treatment lanes.

It is preferred that, for treatment of the mold surface, a rotational speed of at least one treating drum of the treating carriage and/or a center of gravity of the treating carriage and/or a treating pressure of at least one treating drum of the treating carriage are set and may be changed during the treating process.

In the method according to the invention, the parameters defining the mold surface are preferably provided at the control unit, in particular via a user interface, so that the treating process performed by the treating carriage can be carried out automatically or semi-automatically by control of the control unit.

In the method according to the invention, the mold surface is preferably sanded by means of the treating carriage. However, it is also conceivable for the treating carriage to be designed in such a way that, additionally or alternatively, a release agent, a sealing agent, a cleaning agent and/or the like is applied and the mold surface is subjected to a treatment of this kind in the method according to the invention.

Preferably, the method according to the invention uses a guiding arrangement by means of which the treating carriage can be displaced in the transverse direction of the mold and in the longitudinal direction of the mold, i.e., which moves the treating carriage on the mold surface according to the treatment pattern. For example, the guiding arrangement comprises cables or ropes by means of which the treating carriage is displaced or shifted on the mold surface and which are moved in a coordinated manner as a function of one another. The actuation of the guiding arrangement is preferably controlled on the basis of the preset mold surface parameters, in particular by the control unit.

In order to realize the displacement in the longitudinal direction of the mold, it is advantageous if the guiding arrangement itself is displaced in the longitudinal direction of the mold, which can be realized by means of a corresponding actuator, a rail system, a portal and/or the like.

In order to be able to apply ideal effective forces to the mold surface to be treated at all times, the center of gravity of the treating carriage is changed as a function of the position of the treating carriage on the mold surface in a specific embodiment of the method according to the invention.

The method according to the invention can be an integrated part of a method for producing a wind turbine whose wind blades are manufactured in a mold according to a vacuum process.

Other advantages and advantageous embodiments of the subject matter of the invention are apparent from the description, the drawing and the claims.

Examples of embodiments of the subject matter of the invention are illustrated in the drawing in a schematically simplified manner and will be explained in more detail in the following description.

Figure 1:
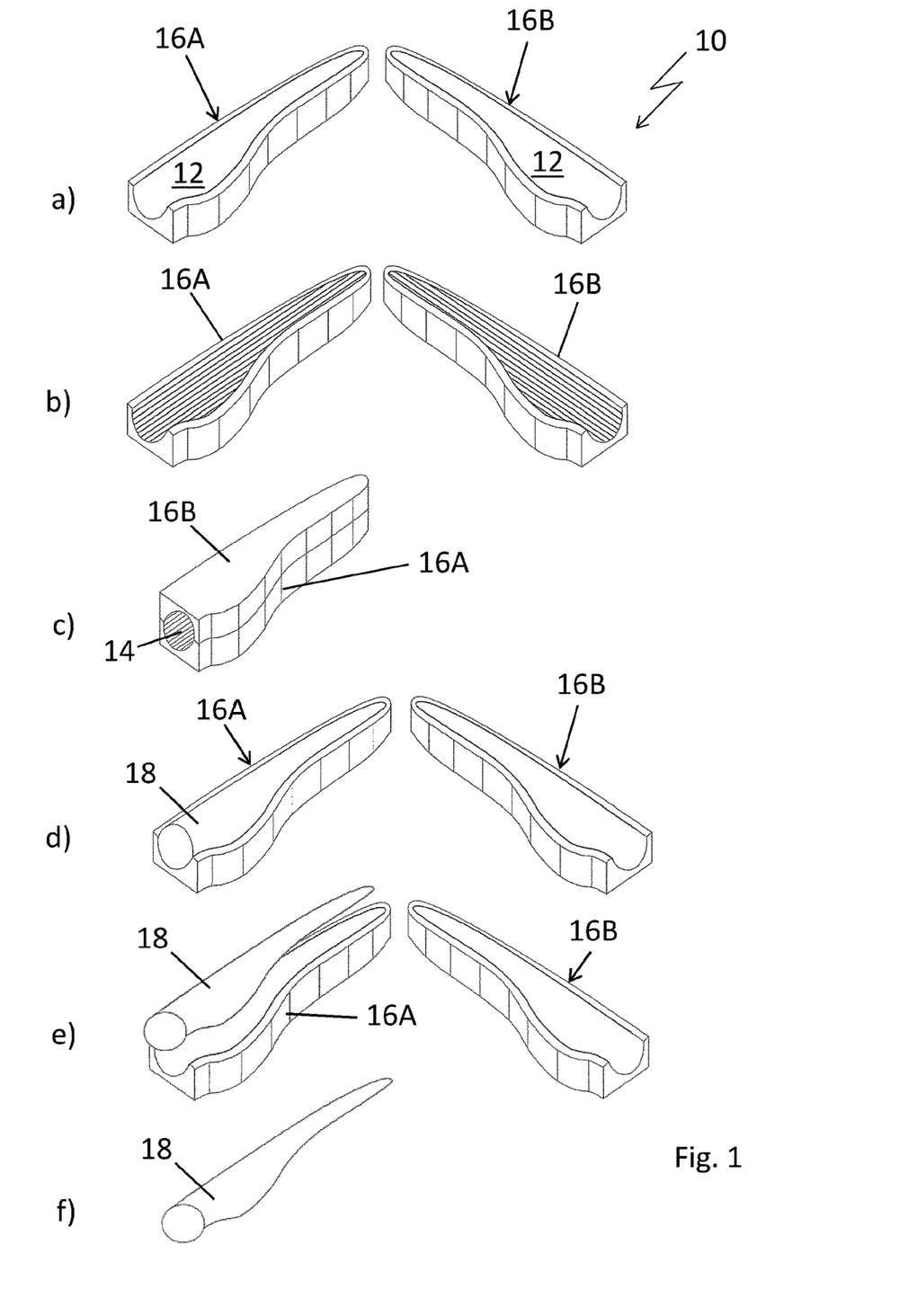
FIGS. 1a to f show steps for producing a wind blade of a wind turbine using a mold.

The production of a wind blade 18 of a wind turbine is illustrated in general terms by FIGS. 1a to 1f. For this purpose, mold cores (not shown) are used to first produce a mold 10 (FIG. 1a). The mold cores have a shape that corresponds to the shape of the wind blade to be produced and define the geometry of mold surfaces 12 limiting a mold cavity 14 in which the wind blade is molded. Mold surfaces 12 are molded in mold halves 16A and 16B which, as shown in FIG. 1c, are joined in order to form wind blade 18.

During production of mold halves 16A and 16B, mold surfaces 12 are subjected to post-treatment by sanding after the mold cores have been demolded. Thereby, the surface quality of mold surfaces 12 is optimized, which results in an optimized surface quality of wind blade 18 to be produced.

Once mold halves 16A and 16B are prepared for the molding process, films, mats, stiffening elements and the like are placed in mold halves 16A and 16B. Additionally, a vacuum film is placed thereon, allowing the placed materials for forming wind blade 18 to be subjected to a vacuum molding process (FIG. 1b).

Subsequently, as FIG. 1c shows, mold halves 16A and 16B are joined in order to carry out the vacuum molding process and connect the wind blade halves disposed in mold halves 16A and 16B.

Subsequently, after curing and cooldown, mold halves 16A and 16B can be separated again (FIG. 1d), allowing molded wind blade 18 to be demolded, as shown in FIG. 1e. Subsequently, wind blade 18 can be subjected to post-treatment (FIG. 1f). This includes the removal of material projections having formed in the area of the separating plane between mold halves 16A and 16B during molding using a suitable cutting tool.

The treatment of mold surfaces 12 of mold halves 16A and 16B prior to the placement of the materials forming wind blade 18 is carried out by means of a treating device 20, which is schematically illustrated in connection with mold half 16A in FIGS. 2 to 4 and which is a sanding machine.

Treating device 20 comprises a treating carriage 22, which is illustrated in detail in FIGS. 9 to 16, and a guiding arrangement 24 comprising a cable system having two cables 26A and 26B which are attached to opposite sides of treating carriage 22 and whose ends facing away from treating carriage 22 are connected to winches (not shown) mounted on respective actuators 28A and 28B. Actuators 28A and 28B are disposed on respective guiding surfaces 30A and 30B of mold half 16A of mold 10. Guiding surfaces 30A and 30B limit mold surface 12 of mold half 16A at the sides and extend in the longitudinal direction Y of mold 10. Actuators 28A and 28B are movable on guiding surfaces 30A and 30B in the longitudinal direction Y of mold 10. For this purpose, a rail arrangement or the like can be provided or a sensor arrangement can be provided that allows actuators 28A and 28B to be guided on guiding surfaces 30A and 30B freely, but in a guided manner.

Mold surface 12 of mold half 16A is sanded by means of treating carriage 22, which comprises two treating drums 32A and 32B in the form of sanding drums. Treating carriage 22 is moved on mold surface 12 in the transverse direction X of mold 10 in parallel treatment strips or lanes by means of guiding arrangement 24 and by corresponding operation of the winches of cables 26A and 26B in order to be able to sand almost the entire mold surface 12 by means of treating carriage 22. Once a treatment lane has been completely sanded by means of treating carriage 22, guiding arrangement 24 is displaced in the longitudinal direction Y of mold 10 by means of actuators 28A and 28B, whereupon a next treatment lane can be sanded by moving treating carriage 22 in the transverse direction X of mold 10. In this way, at least almost all of mold surface 12 of mold half 16A can be successively sanded in an automated manner by means of treating device 20.

The sanding quality can be controlled via the rotational speed of the two sanding drums of treating carriage 22. The speed of movement on mold surface 12, which is predetermined by guiding arrangement 24, also influences the sanding quality. Additionally, the sanding quality can be influenced by the type of abrasive provided on treating drums 32A and 32B.

Optionally, the pressure can be set by changing the height of the sanding drums relative to wheels 66 of treating carriage 22.

The sanding pressure can be changed as a function of the desired sanding result. In principle, however, the sanding pressure should be at a constant value throughout the entire sanding process.

In order to be able to set the sanding pressure, treating carriage 22 additionally has a means 34 for shifting its center of gravity, said means 34 being shifted as a function of the position of treating carriage 22 on mold surface 12. This can take place in an automated manner according to the principle illustrated in FIGS. 4a to 4c, in which means 34, which comprises a pole 36 having a weight 38, is tilted on treating carriage 22 in such a manner that pole 36 is always oriented vertically or, in vertical sections of mold surface 12, almost vertically. Moreover, the center of gravity of treating carriage 22 can be set by changing the attachment points of cables 26A and 26B on treating carriage 22. Other means for shifting the center of gravity of treating carriage 22 are conceivable, such as additional shiftable weights integrated in the superstructure of treating carriage 22.

Treating carriage 22 and guiding arrangement 24 are connected to a control unit 80 provided with a graphical user interface 82. Control unit 80 operates on the basis of parameters provided at user interface 82 and can control the operation of the treating carriage 22, i.e., of sanding drums 32A and 32B, and the adjustment of the center of gravity by tilting pole 36, shifting weight 38 and/or shifting the attachment points of cables 26A and 26B. Furthermore, control unit 80 controls actuators 28A and 28B and the winches of cables 26A and 26B of guiding arrangement 24.

Figure 4:
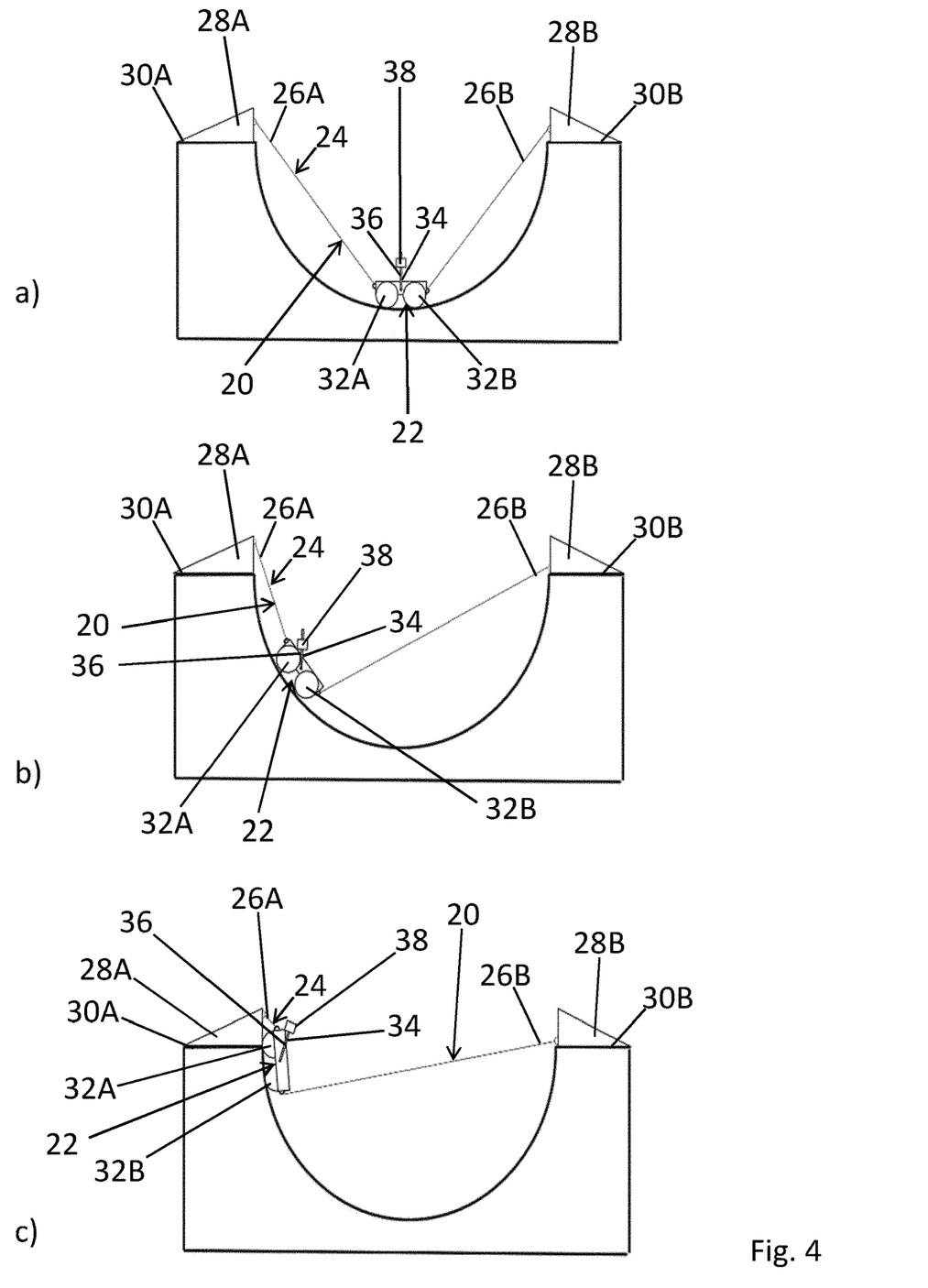
FIGS. 4a to c each show a section through the mold half of FIG. 2 during surface treatment by means of a treating carriage.
Figure 5:
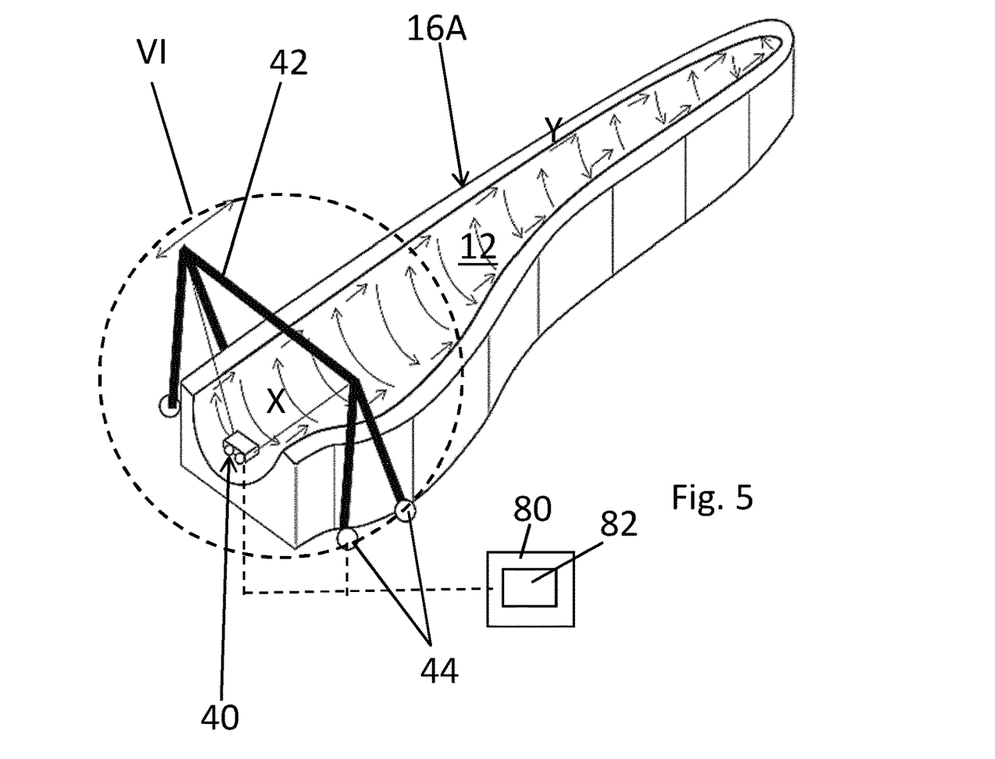
FIG. 5 shows a mold half of the kind illustrated in FIG. 2 with an alternative device for treating a mold surface.
Figure 6:
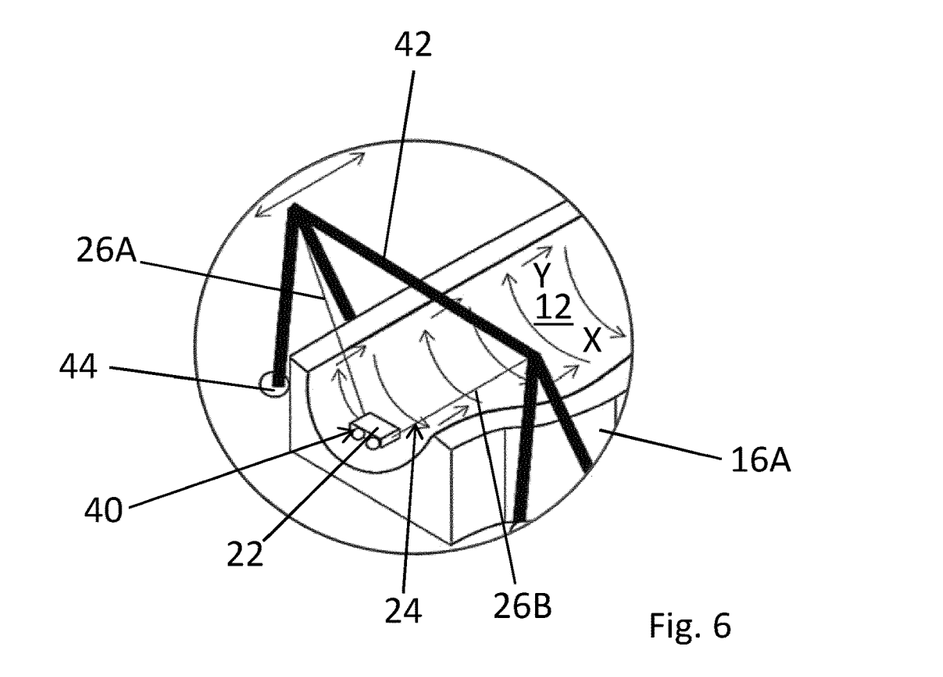
FIG. 6 is an enlarged illustration of area VI in FIG. 5.

FIGS. 5 and 6 show an alternative embodiment of a device 40 for treating mold surfaces 12 of mold halves 16A and 16B of mold 10. Device 40 differs from the device illustrated in FIGS. 2 to 4 in that it comprises a portal 42 straddling mold half 16A or 16B and being provided with rollers 44, allowing it to be moved in the longitudinal direction Y of mold half 16A or 16B. Cables 26A and 26B are attached to portal 42. Winches by means of which the movement of treating carriage 22 in the transverse direction X of mold 10 on mold surface 12 can be controlled via cables 26A and 26B are disposed either directly on treating carriage 22 or on portal 42.

Mold surface 12 is sanded in parallel strips or lanes in the transverse direction X of mold 10 by means of treating device 40 illustrated in FIGS. 5 and 6, as well, for which purpose treating carriage 22 is moved in the transverse direction X of mold 10 on mold surface 12 by means of cables 26A and 26B and, once treatment of a lane is complete, portal 42 is displaced in the longitudinal direction Y of mold 10, whereupon a next treatment lane of mold surface 12 can be sanded by means of treating carriage 22, all under the control of control unit 80.

Figure 2:
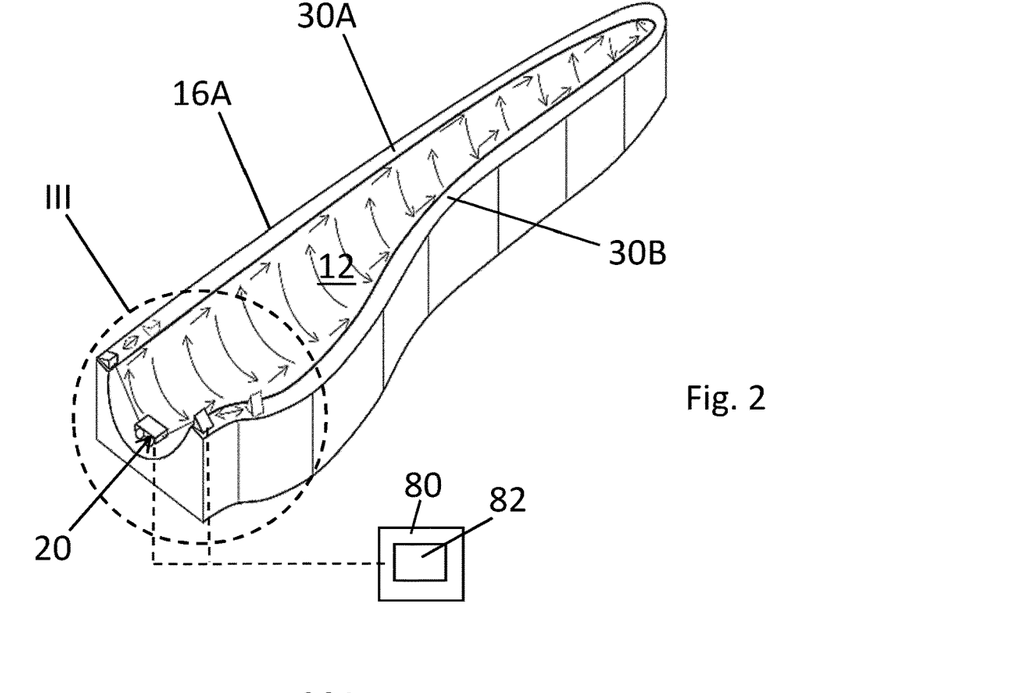
FIG. 2 is a perspective view of a mold half of the mold during its surface treatment.
Figure 3:
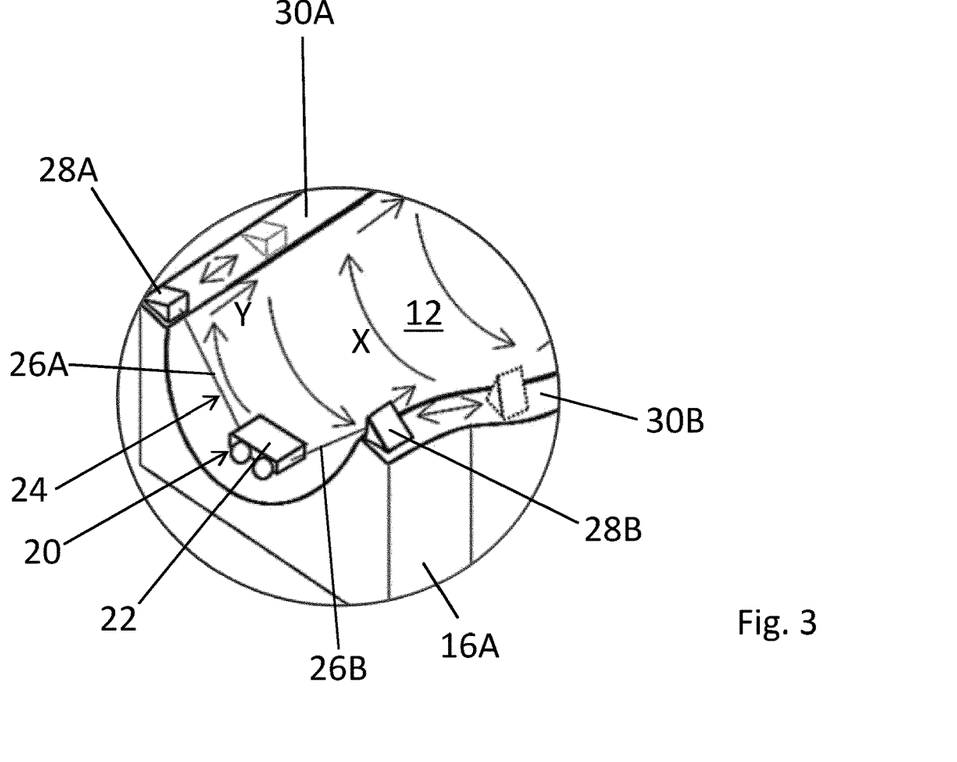
FIG. 3 is an enlarged illustration of area III in FIG. 2.

For the rest, device 40 corresponds to the device shown in FIGS. 2 and 3, which is why reference is made to the related description.

Figure 7:
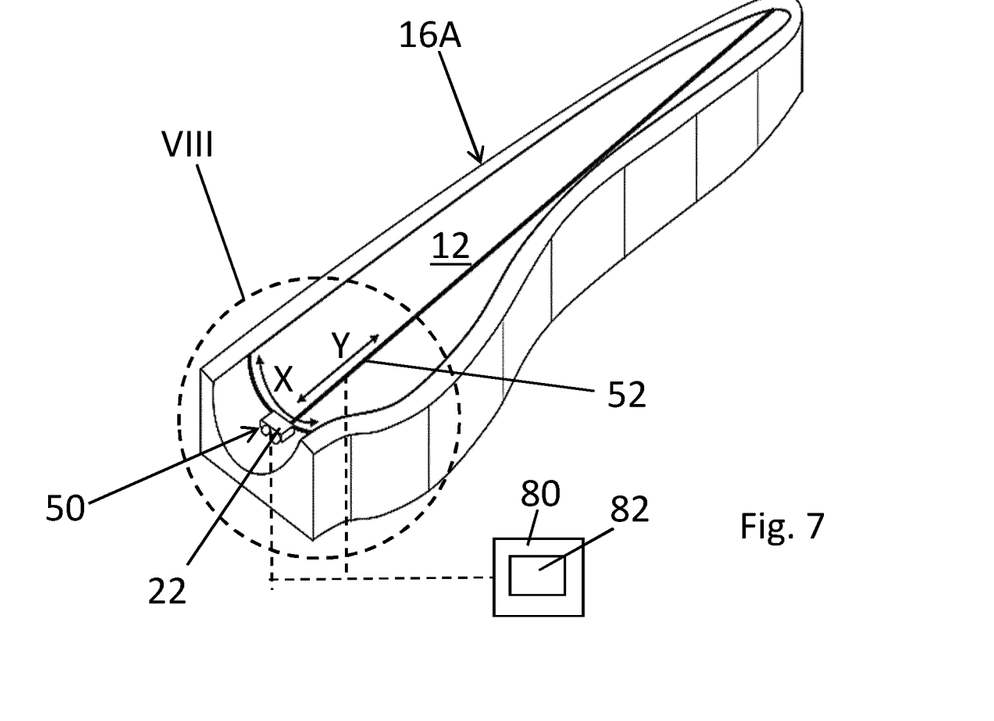
FIG. 7 also shows a mold half of the kind illustrated in FIG. 2, but with another alternative embodiment of a device for treating a mold surface.
Figure 8:
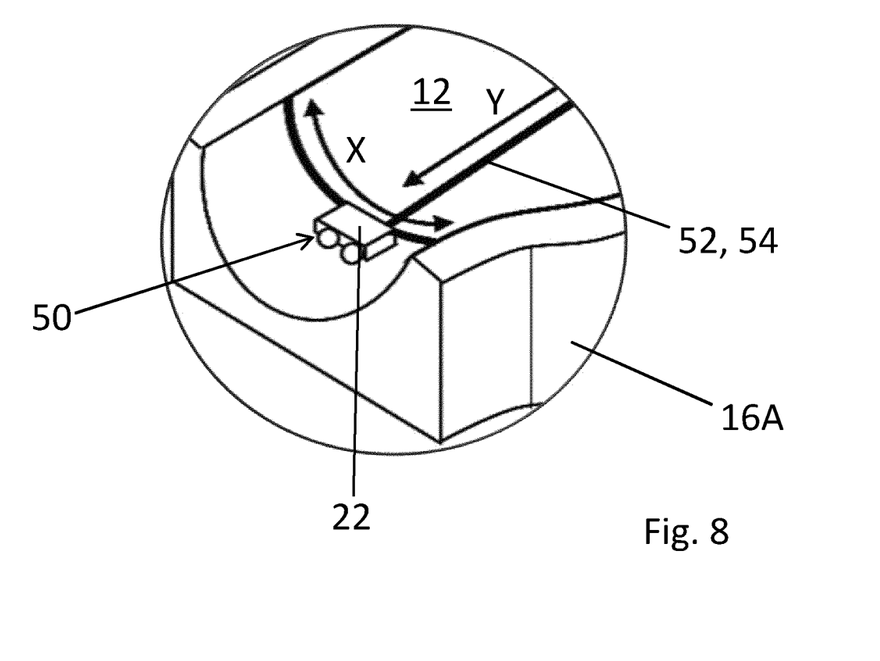
FIG. 8 is an enlarged illustration of area VIII in FIG. 7.
Figure 9:
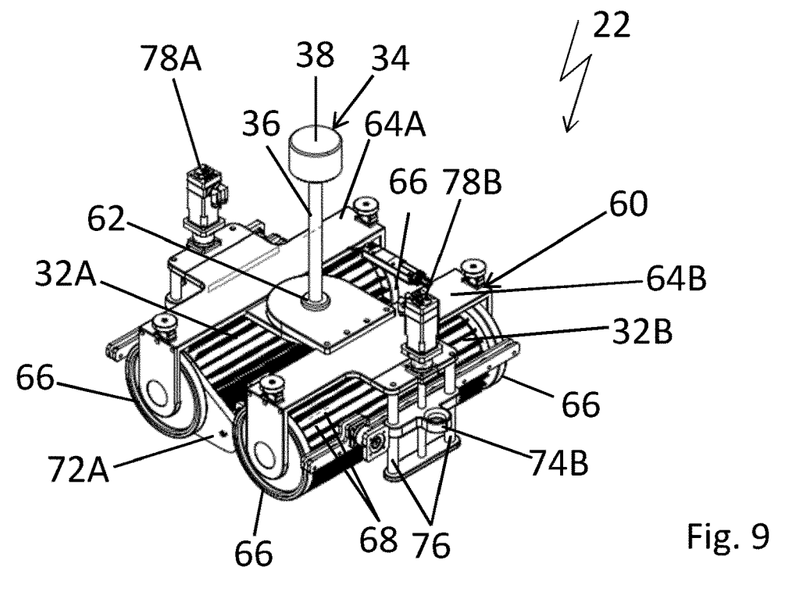
FIG. 9 is a perspective top view of a treating carriage of the device illustrated in FIGS. 2 to 8 for treating a mold surface.
Figure 10:
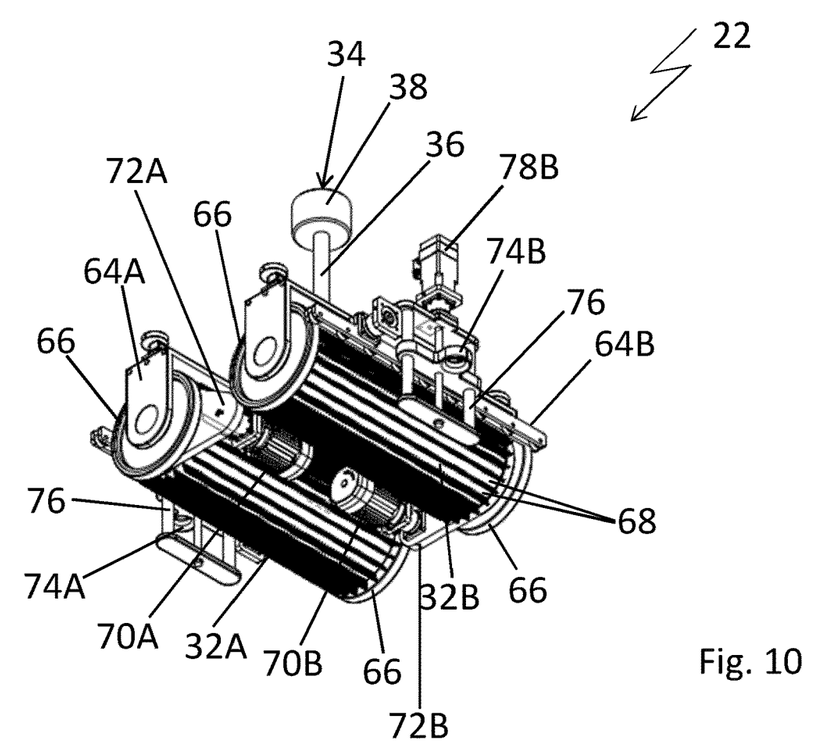
FIG. 10 is a perspective bottom view of the treating carriage of FIG. 9.
Figure 11:
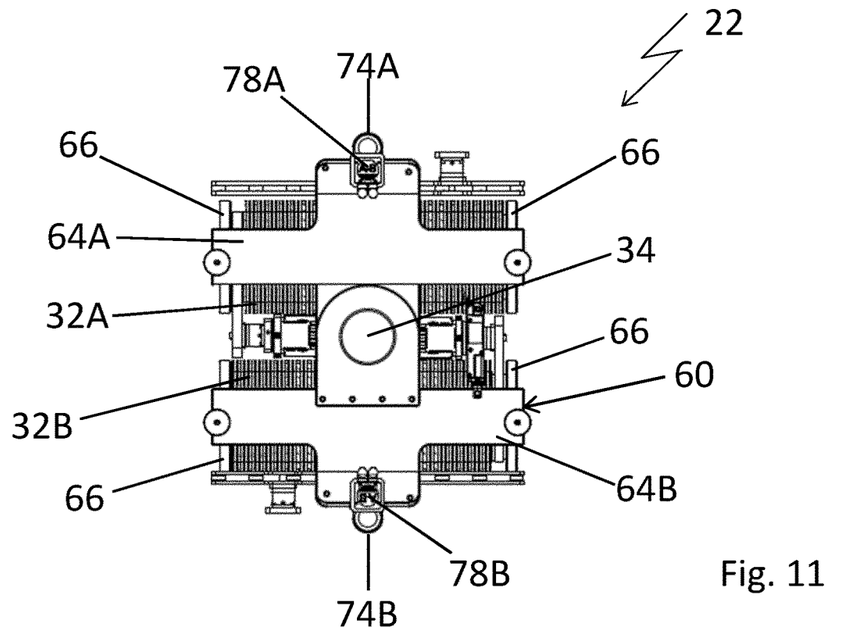
FIG. 11 is a top view of the treating carriage.
Figure 12:
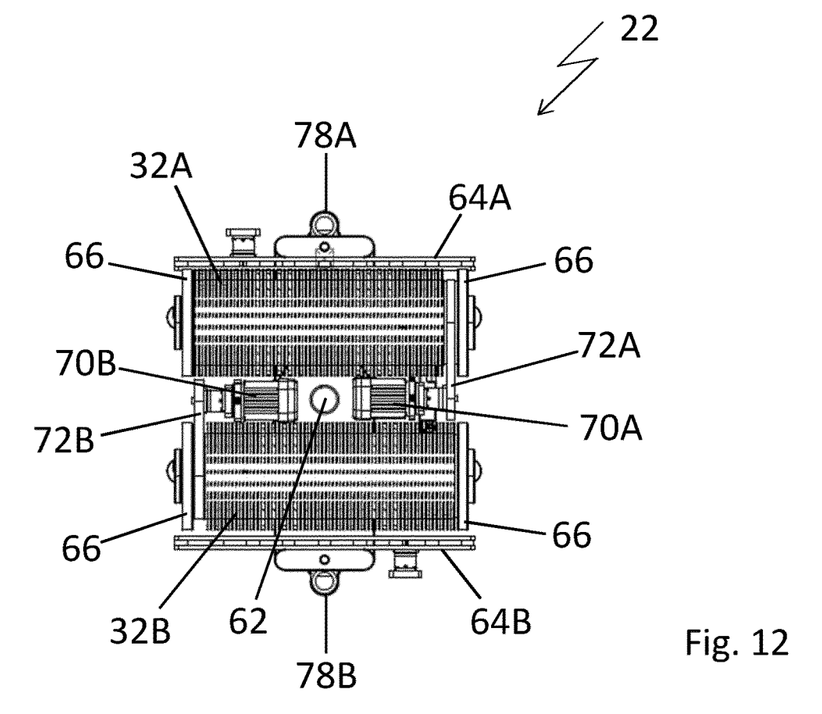
FIG. 12 is a bottom view of the treating carriage.
Figure 13:
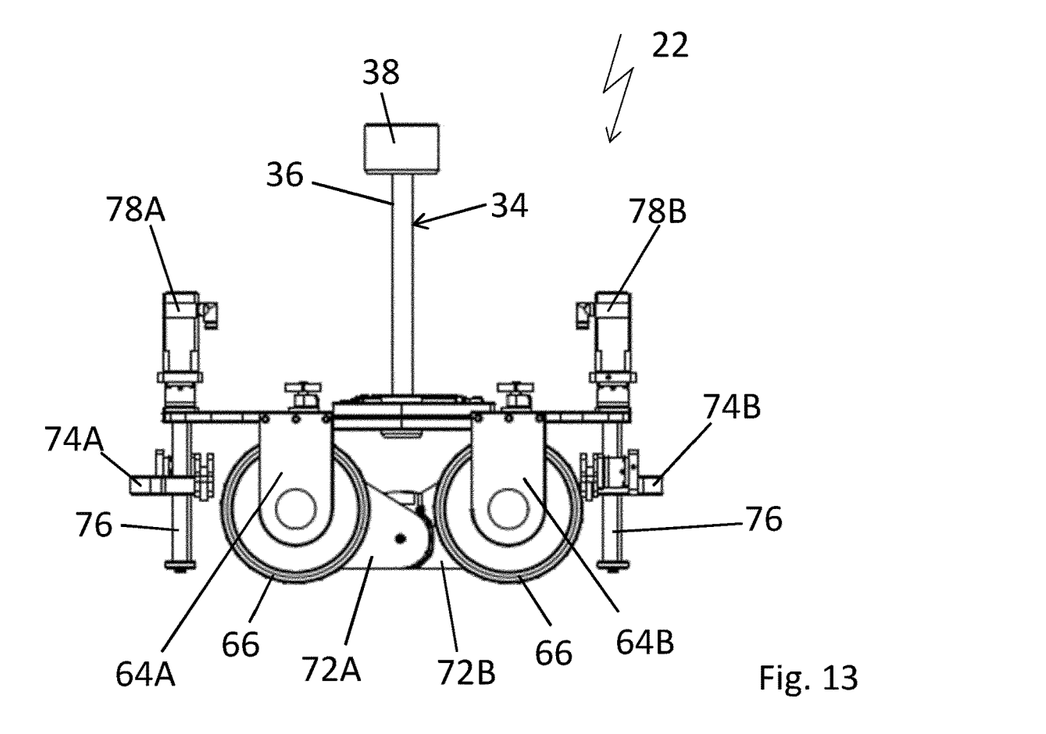
FIG. 13 is a side view of the treating carriage.
Figure 14:
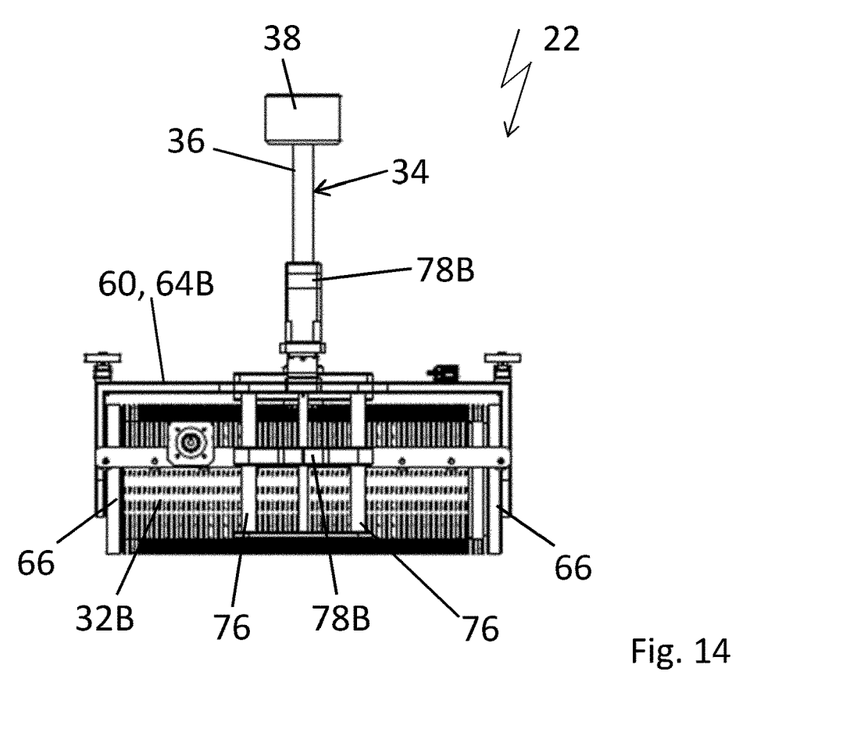
FIG. 14 is a front view of the treating carriage.
Figure 15:
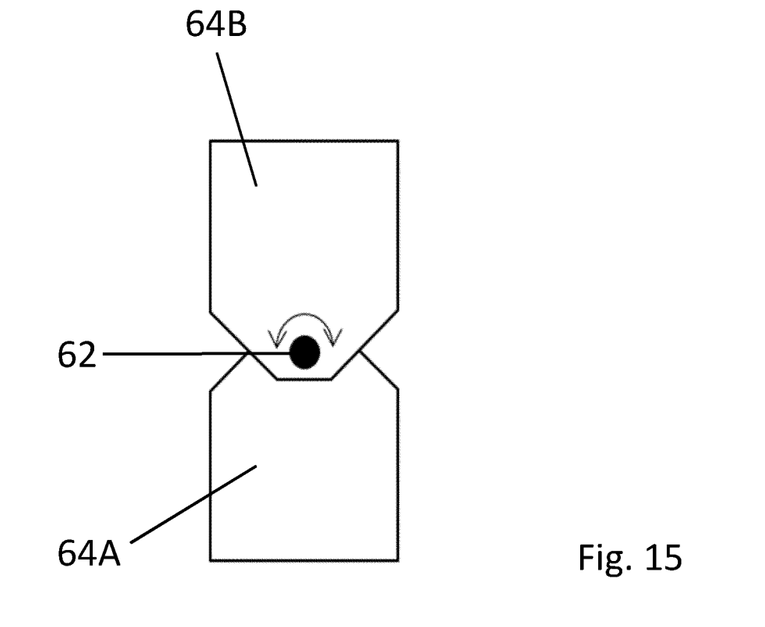
FIG. 15 is a schematic illustration of a support of the treating carriage oriented straight.
Figure 16:
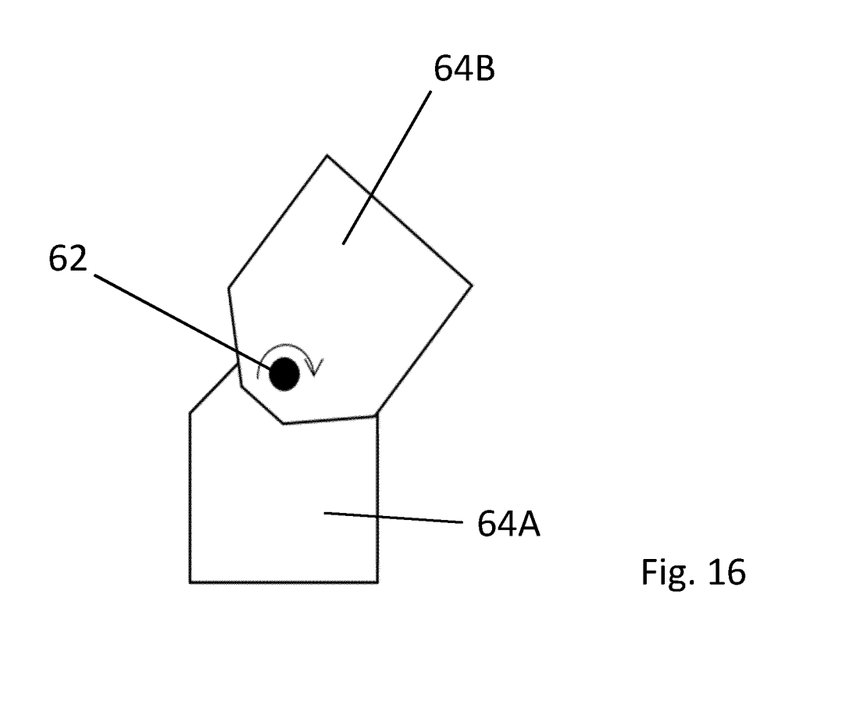
FIG. 16 is a view of the support of the treating carriage corresponding to FIG. 15, but with two support units in a pivoted position.

FIGS. 7 and 8 illustrate a device 50, which is another embodiment of a device for treating a mold surface 12 of a mold half 16A or 16B of a mold 10 for producing a wind blade 18 of a wind turbine. Device 50 also comprises a treating carriage 22 of the kind described with reference to FIGS. 2 to 6. However, treating carriage 22 is coupled with a guiding arrangement 52 which comprises a rail system 54 instead of a cable system, rail system 54 being disposed directly on mold surface 12 of mold half 16A or 16B. By means of rail system 54, treating carriage 22 can be moved both in the transverse direction X of mold 10 and in the longitudinal direction Y of mold 10. Rail system 54 can be attached by means of a vacuum system comprising suction cups or the like. In order for the rail system or the vacuum system to not leave prints on mold surface 12 after the sanding process carried out by means of treating carriage 22, rail system 54 is removed from mold surface 12 step by step during the process, all under the control of control unit 80.

Treating carriage 22, which is illustrated on its own in FIGS. 9 to 16, comprises a support 60 composed of two support units 64A and 64B connected to each other via a joint 62. Two wheels 66 via which treating carriage 22 rests on mold surface 12 and which roll on mold surface 12 when treating carriage 22 is moved are mounted to rotate on each of support units 64A and 64B. One of treating drums 32A and 32B is mounted between wheels 66 on each of support units 64A and 64B. Treating drums 32A and 32B each have a circumferential surface formed by abrasive flaps 68 extending parallel to the axis of rotation of respective wheels 66 and of respective treating drums 32A and 32B. Treating drums 32A and 32B are height-adjustable.

For operating treating drums 32A and 32B, treating carriage 22 has separate drive motors 70A and 70B for treating drums 32A and 32B, respectively, drive motors 70A and being realized as electric motors and driving respective treating drums 32A and 32B via belt drives 72A and 72B. Drive motors 70A and 70B are connected to control unit 80.

Attachment elements 74A and 74B to which respective cables 26A and 26B of the cable system can be attached are disposed on support units 64A and 64B, respectively, attachment elements 74A and 74B being height-adjustable perpendicular to the main plane of treating carriage 22 and being mounted in a displaceable manner on respective guide rods 76 for this purpose. Moreover, respective electric motors 78A and 78B are provided which can realize the height adjustment of respective attachment elements 74A and 74B on respective guide rods 76 via a spindle and which are connected to control unit 80.

For shifting the center of gravity, treating carriage 22 has means 34 comprising pole 36 which is mounted tiltable in the area of joint 62 between support units 64A and 64B and on which height-adjustable weight 38 is disposed. Means 34 are also connected to control unit 80 for shifting and adjusting the center of gravity of the treating carriage.

When treating carriage 22 is used to sand respective mold surfaces 12 of mold halves 16A and 16B by means of treating device 20 illustrated in FIGS. 2 to 4, treating carriage 22 is placed on mold surface 12 in question. Parameters defining the mold surface are input at user interface 82 of control unit 80. On the basis of these parameters, control unit 80 defines a treatment pattern according to which treating carriage 22 is to be moved on mold surface 12. Then, the treatment of mold surface 12 is started by control unit 80. For this, drive motors 70A and 70B are activated, causing treating drums 32A and 32B to rotate with a defined rotational speed and causing abrasive flaps 68 to treat mold surface 12. By correspondingly coordinated operation of guiding arrangement 24, i.e., the winches of cables 26A and 26B, by means of control unit 80, treating carriage 22 is moved on a treatment lane in the transverse direction X of mold 10 from one edge of mold surface 12, which is limited by guiding surface 30A, to the other edge of mold surface 12, which is limited by guiding surface 30B. Then, controlled by control unit 80, actuators 28A and 28B are displaced on guiding surfaces 30A and 30B so as to displace guiding arrangement 24 and treating carriage 22 in the longitudinal direction Y of mold 10, support units 64A and 64B being pivoted relative to each other about joint 62 (see FIGS. 15 and 16) in the process. Then, the next treatment lane of mold surface 12 adjacent to the first treatment lane can be sanded by means of treating drums 32A and 32B, treating carriage 22 again being displaced by corresponding control of the winches of cables 26A and 26B. Once the other edge of mold surface 12, which is limited by guiding surface 30A, is reached again, actuator 28B—and thereby treating carriage 22—is displaced in the longitudinal direction Y of mold 10 again, allowing the next treatment lane to be sanded by treating carriage 22 by corresponding control of cables 26A and 26B in the opposite direction. These treatment steps are repeated until mold surface 12 has been at least almost entirely sanded by means of treating carriage 22.

When treating carriage 22 is moved on the treatment lanes of mold surface 12, the center of gravity is shifted by tilting pole 36 of means 34, as schematically illustrated in FIGS. 4a, b and c.

At least almost the entire treating/sanding process is carried out with computer assistance using control unit 80.

REFERENCE SIGNS

- 10 mold
- 12 mold surface
- 14 mold cavity
- 16A, B mold half
- 18 wind blade
- 20 device
- 22 treating carriage
- 24 guiding arrangement
- 26A, B cable
- 28A, B actuator
- 30A, B guiding surface
- 32A, B treating drum
- 34 means
- 36 pole
- 38 weight
- 40 device
- 42 portal
- 44 rollers
- 50 device
- 52 guiding arrangement
- 54 rail system
- 60 support
- 62 joint
- 64A, B support unit
- 66 wheels
- 68 abrasive flaps
- 70A, B drive motor
- 72A, B belt drive
- 74A, B attachment element
- 76 guiding rod
- 78A, B electric motor
- 80 control unit
- 82 graphical user interface

The invention claimed is:

1. A device for treating a mold surface limiting a mold cavity of a mold or being a surface of a mold core for producing a mold, the device comprising a treating carriage, wherein the treating carriage comprises at least two treating drums, the treating carriage comprising a support on which the treating drums are mounted to rotate, wherein the support comprises a joint allowing the two treating drums to be pivoted relative to each other, wherein the treating carriage comprises two support units on each of which one of the treating drums is mounted, wherein the two support units are connected to each other via said joint which axis is oriented at a right angle to the base plane of the treating carriage; and wherein the treating drums are each mounted between wheels on each of said support units.

2. The device according to claim 1, wherein the treating drum is realized as a sanding drum whose effective outer surface is defined at least partly by abrasive flaps.

3. The device according to claim 1, wherein a drive motor is assigned to each treating drum.

4. The device according to claim 1, wherein the treating carriage comprises a means for shifting its center of gravity, the means for shifting the center of gravity being connected to the control unit and comprising a shiftable weight, the shiftable weight being disposed on a pivotable pole.

5. The device according to claim 1, wherein a guiding arrangement is connected to the treating carriage and serves to displace the treating carriage on the mold surface.

6. The device according to claim 5, wherein the guiding arrangement comprises a cable system attached to the treating carriage, the cable system comprising two cables which are each attached via an attachment element on opposite sides of the treating carriage and which can each be wound up on a winch, the attachment elements being height-adjustable on the treating carriage.

7. The device according to claim 5, wherein the guiding arrangement comprises a portal configured to straddle the mold.

8. The device according to claim 5, wherein the guiding arrangement comprises an actuator which is placeable on a guiding surface of the mold and displaced thereon.

9. The device according to claim 5, wherein the guiding arrangement comprises a rail system.

10. The device according to claim 1, wherein a control unit is provided which comprises a user interface.

11. The device according to claim 10, wherein the control unit is configured to automatically control the treating carriage and/or the guiding arrangement based on preset mold parameters, so that the treating carriage is moved on the mold surface according to a defined treatment pattern.

12. The device according to claim 1, wherein a liquid application and/or release means is provided, which comprises at least one nozzle and/or at least one hose for applying liquid to the mold surface or for supplying liquid to a liquid distribution means of the treating carriage, the liquid being a release agent, a sealing agent and/or a cleaning agent.

13. The device according to claim 1, further comprising a sensor system for determining the quality of the mold surface before and/or after treatment.

14. A method of using the device according to claim 1, the method comprising treating a mold surface, limiting a mold cavity of a mold for producing a wind blade of a wind turbine, or being an outer surface of a mold core for forming a mold cavity of a mold.

* * * * *